Figure 1:
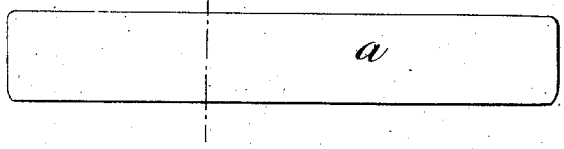

No. 11,976. Reissued Mar. 25, 1902.

C. BENSINGER.

PROCESS OF MANUFACTURING CELLULOID COMBS (Application filed Feb. 24, 1902.)

Fig. 4,

Fig. 5,

WITNESSES:

T. Fitzhoe

J. H. Chaves

INVENTOR

Carl Bensinger

BY

Philipp & Sampson Rich & Kennedy,

ATTORNEYS.

UNITED STATES PATENT OFFICE.

CARL BENSINGER, OF MANNHEIM, GERMANY.

PROCESS OF MANUFACTURING CELLULOID COMBS.

SPECIFICATION forming part of Reissued Letters Patent No. 11,976, dated March 25, 1902.

Original No. 688,222, dated December 3, 1901. Application for reissue filed February 24, 1902. Serial No. 95,494.

*To all whom it may concern:*

Be it known that I, CARL BENSINGER, a subject of the Grand Duke of Baden, residing at M² No. 16, Mannheim, in the Grand Duchy of Baden, German Empire, have invented a new and useful Process of Manufacturing Celluloid Combs; and I do hereby declare that the following is such a full, clear, and exact description of my invention as will enable others skilled in the art to which it appertains to make and use the same.

My invention relates to an improved process of making celluloid combs.

The usual process for the production of the various kinds of celluloid combs consists in first making large sheets or plates of celluloid, then cutting these sheets into smaller strips or plates of a size approximating the size of the comb it is desired to make, and next removing a portion of the celluloid from each side of the said strip or plate near that edge which it is proposed shall receive the teeth of the comb in such a way that the cross-section of said strip will have the desired form for a comb—that is to say, it will be thicker at the back than at the front edge. The removal of the surplus celluloid from the two sides of the strip in order to produce the desired cross-section has been done usually by planing or cutting. The comb-blanks thus produced are now finished by sawing or cutting the teeth in the thinner edge in the usual and well-known way.

In the above method the removal of the side portions of the celluloid from the comb strips or plates involves a considerable loss in material, labor, and time. Many attempts have been made heretofore for the purpose of avoiding this loss, such attempts relating to a production of the comb-blanks by pressing the celluloid in dies, after which the comb-blanks were completed by sawing or cutting teeth in them. In carrying out these attempts two general methods were employed, viz: First, the material employed was either fresh or undried celluloid as it came from the mixing-roller or block-cutting machine, or, second, said material consisted of plates of dried celluloid made plastic by heat. Both these methods have been unsuccessful for the following reasons: In the first method the blanks produced by pressing become porous, owing to the fact that the solvent in the fresh material volatilizes from said material and condenses on the sides of the molds. Also the blanks thus obtained must of necessity be subjected to a drying process, which results in the deformation or warping of the comb-blanks, whereby they are rendered worthless. In the second method as the plates of dried celluloid made plastic by heat were of a substantially uniform thickness, while the comb-blanks to be obtained were of varying thickness, a considerable displacement of the material by the pressure applied took place, thus developing large internal strains in the comb-blanks, whereby it resulted that when the final step of cutting the teeth in the blank was undertaken the blank would break. Hence in all these old pressing processes a certain molecular strain was produced which spoiled the blanks.

It is the object of my invention to produce a comb in such a way as to avoid the disadvantages of the methods heretofore known to me, as above pointed out.

In carrying out my process the comb-blanks are made by a stuffing process—that is to say, fresh and plastic celluloid is forced through an orifice in a die-plate, the said die-orifice having the shape of the desired cross-section of the comb-blank. By this stuffing process a strip of any desired length may be obtained of uniform density and of the desired cross-section, so that when the strip is cut to the desired length for a comb no further treatment will be required to produce a comb-blank. In forming the comb-blanks in this way every portion of the fresh material is so compressed as it is stuffed through the die-plate that the resulting strip is of uniform density and so well freed from the volatile solvents of the celluloid that it cannot be rendered porous, especially as it is not in a close mold, but is compressed by a die-plate open on all sides and on which no condensation of the volatile solvents of the celluloid can accumulate. As a consequence the subsequent drying of the strip cannot cause warping or distortion, since every part of the strip is of a uniform density. The strips are then cut to the desired length to serve as comb-blanks. The comb-blanks prepared with the desired cross-section and having outlines resembling the shape of the desired comb are then submitted to pressure and heat to produce the teeth in the comb, thus bringing the blank into the finished form. By this operation the comb receives its final shape and after cleaning and finishing is ready for market.

It will be seen that by my process the comb-blanks are obtained in the desired shape without loss of material or labor and without producing internal strains in the blank, and as the blanks do not suffer any considerable molecular strain during the pressing the combs produced in accordance with my method are strong and durable.

One of the important advantages of my invention is that it is possible without the expenditure of additional time or labor to produce a comb in which the teeth have oblique surfaces, leaving no corners in which dirt or dust may collect. This form of teeth is very desirable in a comb, since the teeth and the spaces between them may be completely and easily cleaned by a brush. Such a desirable shape for the teeth is readily produced by my process, while by the processes hitherto employed such shape could be obtained only by additional and very expensive handwork.

My process will be fully understood from the above description when read in connection with the accompanying drawings, in which—

Figure 2:
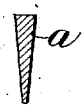
Figure 3:
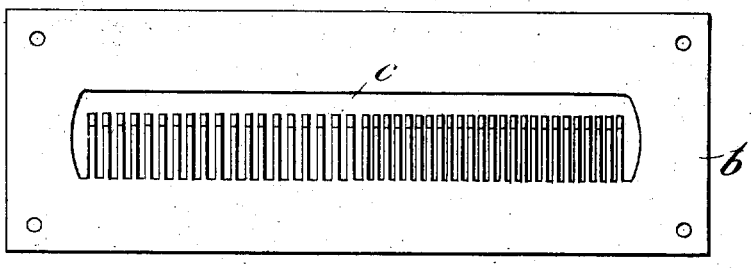
Figure 3:
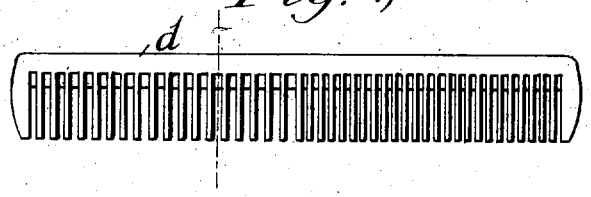
Figure 3:
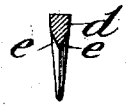

Figure 1 is a side elevation, and Fig. 2 a transverse section, of a celluloid-comb blank produced in accordance with my invention. Fig. 3 illustrates one of the two parts of the mold *b*, the matrix or hollow corresponding to the shape of the comb being indicated at *c*. Fig. 4 is a side elevation of a completed comb *d*, and Fig. 5 a transverse section of the same, the teeth being provided with oblique surfaces, as indicated at *e*.

Having thus fully described my invention, what I claim as new, and desire to secure by Letters Patent, is—

The process of making celluloid combs, which consists in first stuffing the celluloid through a die whose cross-section corresponds to the cross-section of the completed comb, to form a comb-blank, then subjecting the blank to heat and compression to form the teeth and to substantially complete the shape of the comb.

In testimony whereof I have hereunto set my hand in presence of two subscribing witnesses.

CARL BENSINGER.

Witnesses:
W. KLANELM,
H. E. KEIPP.